No. 12,365. REISSUED JUNE 27, 1905.

A. W. WIMMER.

DENTAL PLUGGER.

APPLICATION FILED AUG. 26, 1904.

Witnesses:
Ray White,
Harry R. Lewis

By

Inventor
Alexander W. Wimmer.
Jorée Bain Atty

PHOTO-LITHOGRAPHED BY SACKETT & WILHELMS LITHO. & PTG. CO. NEW YORK.

No. 12,365. Reissued June 27, 1905.

UNITED STATES PATENT OFFICE.

ALEXANDER W. WIMMER, OF CHICAGO, ILLINOIS.

DENTAL PLUGGER.

SPECIFICATION forming part of Reissued Letters Patent No. 12,365, dated June 27, 1905.

Original No. 755,425, dated March 22, 1904. Application for reissue filed August 26, 1904. Serial No. 222,341.

*To all whom it may concern:*

Be it known that I, ALEXANDER W. WIMMER, of Chicago, in the county of Cook and State of Illinois, have invented certain new and useful Improvements in Dental Automatic Pluggers; and I hereby declare that the following is a full, clear, and exact description thereof, reference being had to the accompanying drawings, which form part of this specification.

My invention relates to dental automatic pluggers, and has for its primary object to provide a plugger adapted to strike a series of blows during a single continuous forward movement of the operating-barrel held in the operator's hand.

A further object of my invention is to provide a multiple-stroke plugger comprising as an element a spring-actuated hammer member movable longitudinally relative to the tool-carrying member or spindle and so constructed that the spring tension on the hammer is uniform on all strokes and the strokes or blows struck by the plunger correspondingly even or uniform in force.

Other and further objects of my invention will become apparent from the following specification descriptive of my invention.

Figure 1:
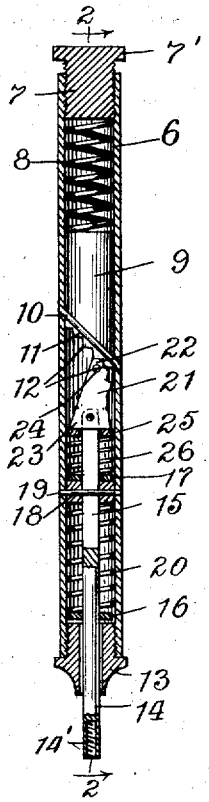
Figure 2:
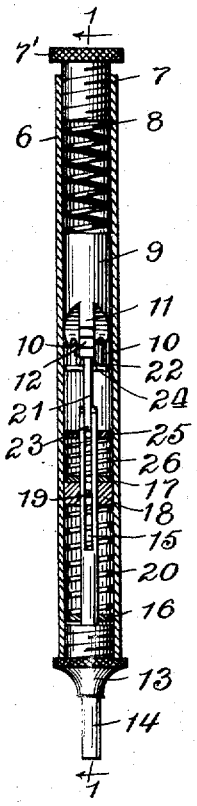
Figure 3:
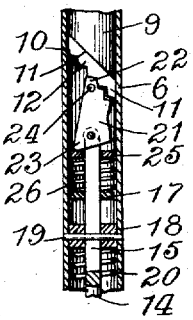
Figure 4:
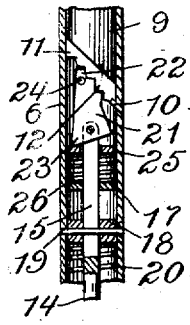
Figure 5:
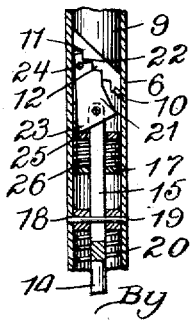

Figure 1 is a central vertical longitudinal section, with some of the parts in elevation, of a plugger embodying my invention, said section being taken on line 1 1 of Fig. 2. Fig. 2 is a similar view taken on line 2 2 of Fig. 1. Figs. 3, 4, and 5 are fragmentary sectional views taken on the same plane as Fig. 1, illustrating different positions assumed by parts of the device during its operation.

In general the present embodiment of my invention may be described as comprising a containing-barrel or handpiece, into which extends axially a tool-carrying member or spindle movable longitudinally relative to the barrel; a hammer member adapted to coact with the spindle member to transmit blows thereto, longitudinally movable with respect to both the spindle and the barrel; a spring interposed between the hammer and a part moving with or forming part of the barrel; means comprising a stop or a series of stops or impact parts carried by one of the coacting hammer and spindle members arranged for successively stopping the movement of the hammer relative to the spindle as the barrel is moved over the spindle to transmit a blow from the hammer to the spindle and movable to release the hammer for movement until again intercepted by a succeeding stop, and means associated with the barrel for controlling the hammer-releasing movements of the stop or stops, arranged to cause the release of the hammer each time after the barrel has moved a sufficient distance relative thereto to put the interposed spring under a predetermined tension.

Referring now to the specific construction shown in the drawings, (throughout which like numerals of reference refer to like parts,) 6 indicates a tubular operating-barrel internally screw-threaded at its opposite ends. The barrel may be of any suitable size and is preferably of uniform diameter throughout.

7 indicates an adjusting-screw threaded into the rearward end of the barrel 6 and preferably provided with a knurled head 7′ to permit of its ready adjustment longitudinally relative to the barrel.

8 indicates a coiled expansion-spring fitting within the barrel, at one end finding abutment against the adjusting-screw 7 and at its other end bearing against the rearward extremity of a hammer member 9, preferably of cylindrical shape, both the spring 8 and hammer 9 being of such size as to fit snugly within the hollow bore of the barrel.

10 10 indicates guide-rods, which constitute controlling means for stops to be hereinafter described, preferably two in number, extending in parallelism through the hollow barrel from side to side thereof, and preferably inclined at a suitable angle to the longitudinal axis of said barrel. These guides 10 preferably form a stop to limit the forward movement of the hammer 9 relative to the barrel under the pressure of the spring 8, the hammer 9 being to this end preferably cut away on both sides at an angle to its longitudinal axis corresponding with the angle of inclination of the guides 10, as indicated in the drawings. Between these angular cuts in the sides of the hammer is left a rib 11, designed to enter between the parallel guides 10, and at its forward edge preferably provided with a series of shoulders, such shoulders being of suitable number, so related that they form an inclined rack having a series of step-like teeth, the inclination of the rack corresponding with that of the guides 10.

13 indicates a cap threaded to fit within the forward end of the barrel 6 and centrally perforated to receive the tool-holding member or spindle 14, mounted for reciprocation therein. The spindle 14 is of suitable length to extend from a point adjacent the inclined guides 10 and to project to suitable distance beyond the forward end of the cap 13. It is preferably provided at its lower end with a tool-receiving threaded recess 14′ and at its rear end is bifurcated by a slot 15, extending longitudinally thereof a proper distance to permit the operation hereinafter described.

16 and 17 indicate two collars suitably secured to the spindle 14, one at a suitable point to normally find bearing upon the top of the cap 13 and the other a short distance in front of the rear end of the spindle. These collars are preferably of such size as to fit accurately within the bore of the casing 6, so that they serve to aid in maintaining the spindle always in proper axial position relative to its operating-barrel.

18 indicates an annular bearing-block surrounding the spindle 14 and secured to the barrel 6, preferably at a point immediately below the collar 17.

19 indicates a pin taking through the casing 6, the block 18, and the slot 15 in the spindle 14 to secure the block 18 firmly in its place and afford a guide for the spindle 14 to prevent rotative movement thereof while permitting its free longitudinal reciprocation relative to the barrel.

20 indicates a coiled spring interposed between the collar 16, carried by the spindle and the block 18, secured to the casing 6 and tending to hold said spindle 14 constantly at its forward limit of movement.

Associated with one of the coacting hammer and spindle members, preferably the former, I provide movable impact means comprising one or more stop devices adapted to coact with one or more opposing surfaces of the remaining hammer or spindle member to transmit impacts from the hammer to the spindle, said impact means being arranged to afford connection between the hammer and spindle while the hammer-actuating spring is being compressed and movable under the control of the barrel when the spring is sufficiently compressed to release the hammer for an excursion relative to the spindle until again intercepted by the coaction of the stop device and opposing surface next in succession. In the specific construction shown the impact means consists of a pawl 21, pivotally mounted in the slot 15 of the spindle 14 to project rearwardly therefrom. The pawl 21 is provided at its rearward end with one or more teeth 22, which constitute stop devices adapted to coact with the teeth of the hammer 9 and on the forward side of its pivot is provided with a nose 23 for purposes to be described. The position of the pawl 21 is such that when moved rearwardly it tends to pass between the guides 10 10 in contact with the hammer 9.

24 indicates a pin disposed at a suitable point near the rear end of the pawl and projecting on both sides thereof, so that its path of rearward movement will be intercepted by the guide 10, carried by the casing.

25 indicates a washer slidably mounted upon the spindle 14 in front of the pawl 21 21 and yieldingly held in constant contact therewith by a coiled spring 26, surrounding the spindle, and bearing at its opposite ends, respectively, against the collar 17 and the said washer 25.

In the present embodiment of my invention I have illustrated a plugger adapted to deliver three blows during a single movement of the operating-barrel relative to its spindle and to that end have illustrated the hammer-rack as provided with three operative serrations or teeth 12. It will be apparent, however, that more or less teeth may be employed to deliver a greater or less number of blows as found convenient and as best adapted to the dimensions of the plugger to be manufactured.

The pawl 21 is preferably provided with a series of teeth equal in number to the operative teeth of the hammer-rack, the teeth being so displayed upon the pawl that in whatever position of its lateral oscillation the pawl may rest its contact with the hammer 9 is made only through the tooth of the pawl axially alining with the spindle and the tooth of the hammer corresponding in position thereto.

The use and operation of my invention will be as follows: Normally the parts are held in the positions illustrated in Figs. 1 and 2—that is to say, with the spindle 14 maintained by the spring 20 at its forward limit of movement and the hammer 9 also maintained by its spring 8 in forward position, so that it abuts against the guides 10. In such position the pressure of the movable collar 25 upon the nose 23 of the pawl 21 serves to hold said pawl at its limit or lateral movement in such direction that the uppermost tooth 22 thereof contacts with the lowest operating-tooth 12 of the hammer-rack. In such position the pin 24 will be slightly below the inclined guide 10 and out of contact therewith. If now the operating-barrel be held in the operator's hand and the projecting end of spindle 14 or a tool carried by said spindle be pressed against some resisting body, such as the metal in the tooth undergoing the filling operation, the barrel is moved longitudinally relative to the spindle, causing the pawl carried by the spindle to raise the hammer 9 against the tension of its spring 8. When the barrel has moved a sufficient distance relative to the spindle, the pin 24 of the pawl 21 contacts with the inclined guides 10, so that further forward movement of the barrel 6 causes the guides to move the pawl laterally from beneath the shoulder of the first tooth 12 of the hammer. Consequently the hammer drops a distance corresponding with the height of one of the said teeth 12, its second operative tooth striking upon the pawl and delivering a sharp clean blow thereto, which is transmitted therethrough to the spindle. Further movement of the barrel relative to the spindle causes this operation to be repeated as many times as there are operative teeth or stops upon the pawl 21, the parts ultimately assuming the position illustrated in Fig. 5, when further lateral movement of the pawl is prevented by its contact with the inner wall of the barrel. It will be apparent that as the pawl is moved to permit the hammer to drop each time the barrel moves a distance corresponding with the height of a pawl-tooth (after the pin 24 has initially been brought into contact with the guides 10) the spring tension on the hammer at the commencement of each stroke will be the same, and (the distance from stop to stop being equal) the force of all of the strokes will be uniform. It will of course be apparent that the number of blows which may be struck may be increased or decreased to any suitable number, according to the number of teeth employed. It will be noted, however, that the pawl 21 is provided with a series of teeth—in the present instance three in number—so disposed relative to each other that during the transverse step-by-step movement of the pawl said teeth are successively brought into substantially axial alinement with the spindle 14. It will also be noted, and it may be clearly seen from inspection of Figs. 3 to 5, that in each blow only one tooth of the pawl is struck by the hammer, in each instance the tooth struck being that in axial alinement with the spindle.

The construction illustrated, having both the hammer and the pawl provided with racks, is not essential, as it will be apparent that when the hammer is toothed as illustrated the pawl need have but a single tooth. Such construction, however, is not so advantageous as that illustrated, as the successive blows would be struck with the tooth of the pawl in different angular positions with reference to the axis of the spindle, so that the force of the blow would not be so directly applied to the said spindle as in the illustrated structure. On the other hand, however, when the pawl 21 is provided with a series of teeth corresponding with the number of blows to be struck, as in the present construction, it will be apparent that only two step-like shoulders need be employed on the hammer, one of each shoulders being disposed in alinement with the axis of the hammer and the other just below said axis. I prefer, however, to construct the device as herein illustrated, providing equivalent rack-teeth on both the hammer and pawl members in order that the operation of the device may be but little affected by wear or by the breaking of a tooth of either rack.

During the operation of the pawl and hammer in the manner described it will be apparent that lateral tilting of the pawl causes its nose 23 to depress the sliding collar 25, surrounding the spindle 14, putting the coiled spring 26 under compression. When now the plugger has completed its series of strokes during the forward movement of the barrel relative to its spindle, the operator relieves the pressure on the barrel, and the coiled spring 20, acting upon the collar 16 of the spindle and the bearing-block 18 of the casing, restores such parts to their initial position, as illustrated in Fig. 1. At the same time the spring 26, acting through the collar 25 upon the nose 23 of the pawl 21, restores said pawl to its initial position at its normal limit of movement the spring 8 presses the hammer 9 forward against the guide. The parts are now all again in normal position.

While I have herein for purposes of full disclosure shown and described an embodiment of my invention which I consider to be an advantageous one, I do not desire to be understood as limiting myself to the specific construction shown in all its details, as it will be apparent to those skilled in the art that many changes in the details of construction thereof might be made without departing from the spirit and scope of my invention.

Having thus described my invention, what I claim, and desire to secure by Letters Patent of the United States, is—

1. In a dental plugger, the combination with a tool-carrying member and a hammer member mounted for relative longitudinal movement, of an impact part carried by one of said members arranged to stop the relative movement of said members, to transfer a blow from the hammer to the spindle member and movable to release the said members from further relative movement.

2. In a dental plugger, a tool-carrying member and a hammer member mounted for relative longitudinal movement, movable means carried by one of said elements for sharply stopping the said relative movement of the elements, said means being movable to successively stop the movement of the said members and release them for further movement.

3. In a dental plugger, the combination with a hammer member and a tool-carrying member associated for relative longitudinal movement, of movable means carried by one of said members for stopping the relative movement of said members at a plurality of points in their excursion and connecting them against relative movement, said means being movable to release the said members for further relative movement, a hammer-spring and a means for putting the hammer-spring under tension operatively associated with the said movable means to govern the movement thereof to position to release the hammer and tool-carrying members.

4. In a dental plugger, a tool-carrying member, a coacting hammer member, a handpiece, a spring between the handpiece and hammer, the hammer and handpiece being independently movable longitudinally of the tool-carrying member, and movable means carried by one of the coacting tool-carrying and hammer members adapted to successively stop, hold and release the said coacting members to transmit a series of impacts from the hammer to the coacting member, and means associated with the handpiece for movement therewith arranged to control the releasing movement of said movable means.

5. In a dental plugger, a spindle member, a coacting hammer member longitudinally movable relative thereto, a barrel longitudinally movable relative to both of said members, a spring interposed between the hammer and barrel, a series of stops, carried by one of said coacting hammer and spindle members, adapted and arranged to successively stop the relative movement between said members to transmit a series of blows from the hammer member to the spindle member, and movable to release said members for movement to the next stop, and means operatively associated with the barrel governing the releasing movement of said movable means.

6. In a dental plugger, a spindle member, a coacting hammer member longitudinally movable relative thereto, a barrel longitudinally movable relative to both of said members, a spring interposed between the hammer and barrel, an impact part having a series of step-like teeth carried by one of the coacting hammer and spindle members, movable to successively bring its teeth into position of contact with a portion of the other member, or to release such other member for movement into coaction with the next succeeding tooth, and means associated with the casing for governing the movement of said impact part.

7. In a dental automatic plugger, a barrel, a hammer mounted therein, a spindle slidably mounted in said barrel and arranged to project therefrom, a pawl carried by the said spindle and arranged to coact with the hammer, one of said coacting elements being provided with an inclined rack having a series of step-like teeth, and the other of said elements being provided with a coacting tooth, and means operated by the movement of the barrel relative to the spindle, for moving the pawl laterally during the movement of the barrel, to permit the tooth of one element to successively pass the rack-teeth of the coacting element to cause the hammer to be successively lifted and released by the pawl.

8. In a dental automatic plugger, a barrel, a hammer arranged within said barrel, a spring for pressing said hammer constantly in a forward direction, a spindle slidably mounted in the barrel to project from the forward end thereof, a pawl carried by said spindle, and adapted to coact with the hammer, one of said coacting elements being provided with a series of teeth disposed in step-like arrangement, and a coacting member being provided with a tooth designed for engagement therewith, and means for moving said pawl laterally during the movement of the barrel relative to the spindle, to permit the teeth of the one coacting member to successively pass the tooth of the other.

9. In a dental automatic plugger, the combination with a barrel of a spring-actuated hammer mounted for reciprocation therein, an inclined rack having a series of step-like teeth, carried by the hammer, a spindle slidably mounted in the barrel and arranged to project therefrom, a laterally-movable pawl carried by the spindle and arranged to coact with the rack carried by the hammer, means for holding said pawl normally at one limit of its movement, and means for moving the pawl laterally during the movement of the barrel relative to the spindle.

10. In a dental automatic plugger, the combination of a barrel, a hammer mounted for reciprocation therein, a spindle slidably mounted in said barrel and arranged to project therefrom, a pawl carried by said spindle arranged to coact with the hammer, one of said coacting elements being provided with a rack having a series of step-like teeth, and the other of said elements being provided with a coacting tooth, and an inclined guide carried by the barrel arranged to direct the movement of the pawl laterally during the movement of the barrel relative to the spindle, whereby the teeth of the rack carried by the one element are caused to successively engage and release the tooth of the coacting element.

11. In a dental automatic plugger, a barrel, a spring-actuated hammer mounted for reciprocation therein, an inclined rack carried by said hammer, a spindle slidably mounted in the barrel, a pawl pivotally mounted on said spindle and arranged to coact with the hammer-rack, means for normally maintaining said pawl at one limit of its pivotal movement in alinement with a relatively forward tooth of the hammer-rack, and an inclined guide carried by the barrel and arranged to coöp-erate with the pawl to move said pawl laterally during the movement of the barrel relative to the spindle.

12. In a dental automatic plugger, the combination with the barrel 6, of a spring-actuated hammer 9, mounted therein and provided with an inclined rack on its forward end, a spindle 14, slidably mounted in the forward end of said barrel, a toothed pawl 21, pivoted in the spindle, a spring for maintaining said pawl at one limit of its movement, a pin 24, carried by said pawl, and a guide 10 arranged in the path of movement of the pin 24 and inclined in parallelism to the hammer-rack.

In testimony whereof I have signed this specification in the presence of two witnesses.

ALEXANDER W. WIMMER.

Witnesses:

GEO. J. MAY, JR.,

MARY F. ALLEN.